United States Patent
Tokieda et al.

(10) Patent No.: US 7,130,792 B2
(45) Date of Patent: Oct. 31, 2006

(54) METHOD FOR OFFERING MULTILINGUAL INFORMATION TRANSLATED IN MANY LANGUAGES THROUGH A COMMUNICATION NETWORK

(75) Inventors: Hidemasa Tokieda, Zama (JP); Tadao Mikami, Chiba (JP); Koji Mori, Tokyo (JP)

(73) Assignee: IIS Inc., Tokyo (JP)

( * ) Notice: Subject to any disclaimer, the term of this patent is extended or adjusted under 35 U.S.C. 154(b) by 924 days.

(21) Appl. No.: 10/149,230

(22) PCT Filed: Jul. 4, 2001

(86) PCT No.: PCT/JP01/05804

§ 371 (c)(1),
(2), (4) Date: Jun. 10, 2002

(87) PCT Pub. No.: WO02/33607

PCT Pub. Date: Apr. 25, 2002

(65) Prior Publication Data

US 2002/0193983 A1     Dec. 19, 2002

(30) Foreign Application Priority Data

Oct. 16, 2000   (JP)   .............................. 2000-315357
Oct. 16, 2000   (JP)   .............................. 2000-315679

(51) Int. Cl.
*G06F 17/28*   (2006.01)
(52) U.S. Cl. ........................................................ 704/7
(58) Field of Classification Search ..................... None
See application file for complete search history.

(56) References Cited

U.S. PATENT DOCUMENTS 6,438,594 B1 *  8/2002  Bowman-Amuah ......... 709/225
6,601,108 B1 *  7/2003  Marmor ...................... 709/246

FOREIGN PATENT DOCUMENTS

| JP | 8-83280    | 3/1996  |
| JP | 10-207892  | 8/1998  |
| JP | 10-269285  | 10/1998 |
| JP | 11-3337    | 1/1999  |
| JP | 11-661822  | 3/1999  |
| JP | 11-167578  | 6/1999  |
| JP | 11-203008  | 7/1999  |
| JP | 3069582    | 3/2000  |
| JP | 00-215136  | 8/2000  |
| JP | 00-276431  | 10/2000 |

* cited by examiner

*Primary Examiner*—Abul K. Azad
(74) *Attorney, Agent, or Firm*—Manabu Kanesaka

(57) ABSTRACT

A method for performing a multilingual information offer through a communication network includes a step of translating contents of information into many languages, and a step of entering the translated contents into a multilingual processing database, wherein a page record and a text record are given for processing each page of the translated contents in the multilingual processing database. Multilingual translated contents of information and advertisements are provided. A number of visitors to an information site in each language is counted, and an advertisement charge is charged to an advertiser on the basis of the number of visitors. These steps are performed through one Web site having one apparatus and one translation processing system.

12 Claims, 11 Drawing Sheets

These steps are repeated for necessary languages

METHOD FOR OFFERING MULTILINGUAL INFORMATION TRANSLATED IN MANY LANGUAGES THROUGH A COMMUNICATION NETWORK

TECHNICAL FIELD

The present invention relates to a method for offering information in many languages through a communication network by utilizing the communication network and performing translation in many languages, a method for performing a virtual trade fair and exhibition in many languages, and a communication system and information recording medium for the same methods.

BACKGROUND ART

Up to now, an example utilizing a communication network (Internet for example) under a TCP/IP (Transmission Control Protocol/Internet Protocol) environment is known as a multilingual translation service of this kind.

FIG. 12 is a block diagram for explaining the architecture of a conventional Web (Web: World Wide Web) site for performing multilingual translation, and FIG. 13 is a flowchart showing a procedure for performing multilingual translation by the Web site of FIG. 12. And FIG. 14 is a flowchart showing a procedure for maintenance of multilingual translation by the Web site of FIG. 12.

In this example, as shown in FIG. 12, a Web site connected to a TCP/IP transmission circuit network has been built for each of Japanese, English, German, French, and so forth in many languages. In each Web site, a Web server processes one of the respective languages (ranging from Japanese to French and so forth). Such a Web site is a processing system of hardware having software installed in it, namely, an individual firmware.

This architecture is a structure in which a UNIX workstation or the like to be a Web site is connected to such a digital circuit network as ISDN or the like, and a general-purpose small computer, and a UNIX workstation or the like to be used by a translator and further a general-purpose small computer, a UNIX workstation or the like to be used by a translation requester are connected to the digital circuit network. In this communication network structure, a two-way communication through a so-called Internet communication is performed by a Web browser (application).

In such a multilingual translation service, in a process of multilingual translation of FIG. 13, a master site is downloaded and copied through a TCP/IP transmission circuit network (step S1), and data of HTML (Hyper Text Markup Language) of its language portion are extracted and converted into language data (step S2). Next, the language data is translated into a destination language (step S3). After this, the translated language is converted into HTML data (step S4). Further, the language HTML data are ported into a copy site and adjusted (step S5). These processes are repeated for necessary languages.

And in a maintenance process of FIG. 14, a Web administrator is notified of change of a master site (step S11), and a language portion needing to be translated is selected (step S12). HTML data of the language portion are extracted and converted into language data (step S13). Next, the language data are translated (step S14) and these translated language data are converted into HTML data (step S15). Next, the language HTML data are ported into a Web site and adjusted (step S16). These steps on and alter the step of extracting and converting HTML data of the language portion into language data are repeated for necessary languages. In this way, a multilingual translation service utilizing the Internet is offered.

And translation of contents into only one's native language is frequently performed, but the same contents are translated and offered infrequently in many languages.

DISCLOSURE OF THE INVENTION

In such a conventional example as described above, a Web site using the Internet for each language of many languages is built and each Web server processes a language.

Therefore, it has a disadvantage that such a system is enlarged in processing scale and apparatus scale. Due to this, it has not been possible to translate information of a trade fair being held in various countries in the world into many languages and provide the information.

The present invention attempts to solve such a problem of the prior art, and an object of the present invention is to provide a method for performing multilingual translation through a communication network, said method making it possible to perform translation in many languages by means of a single Web site on a communication network and suppress its enlargement in processing scale and apparatus scale, and a communication system and information recording medium for the same method.

Such translation as described above is performed through a translation network organized in order to always secure translators. Master contents containing information and advertisements are translated into many languages and stored into a database, and multilingual contents which a terminal side can call and read in a desired language are offered.

And the present invention aims at making it possible to call and read desired trade fair and exhibition information in a desired language from a multilingual contents database of trade fair and exhibition information translated into many languages and stored.

The present invention aims at providing a method for collecting advertisement charges from an advertiser whose advertisements have been published. Further it aims at making it possible to offer more specialized information in many languages to persons registered in advance.

Thereupon, in order to attain the above objects, the present invention provides a method for providing a multilingual information service making it possible to read a contents database offered by performing multilingual translation through a communication network, said method comprising a step of translating information into many languages, a step of entering the translated data into a multilingual processing database, a step of publishing various kinds of translated information and advertisements, a step of counting visitors to an information site in each language, a step of demanding an advertisement charge from an advertiser on the basis of a visitor count, and a step of performing these steps through one Web site consisting of one apparatus and one translation processing system.

Said step of translating information in many languages comprises a step of receiving language data of a subject of translation, a step of automatically selecting language data for translation, a step of performing translation, a step of automatically changing the translation processing form adaptively to a language after translation, and a step of receiving the translated data from a translator. In said step of automatically selecting language data for translation, said information to be translated is prepared by making language data and image data being non-language data in master contents by means of a template. Further, a method of the present invention converts language data contained in said image data from a text form into a binary form and replaces the text-form data with the binary-form data.

Said step of performing translation is an automatic machine translation and/or a manual input translation. A method of the present invention gives a page record and a text record as contents information for processing each page in said multilingual processing database. And a method of the present invention sets a storage area adaptively to the maximum number of characters, judges whether or not characters of a language after translation can be accommodated in the storage area of the maximum number of characters in comparison with the number of characters of the language before translation through computing the number of characters after translation and, in case that the maximum number of characters after translation can be accommodated in the storage area, performs the translation, and in case that the maximum number of characters cannot be accommodated in the storage area, reduces the number of characters of the language before translation so as not to change the meaning. In this way, said Web site consisting of one apparatus and one translation processing system performs a multilingual translation process and its maintenance process.

And a method of the present invention, as said multilingual translation process, generates master contents by means of a template, next translates language data of the master contents, repeats these generation and translation processes, stores the language data together with control information into a multilingual processing database, further converts the language data into HTML data and writes them into the master contents on request; and as the maintenance process, monitors change of the master contents, automatically selects a language data file needing to be translated, translates the language data, repeats these monitor, automatic selection and translation processes for necessary languages, and reenters the translated language data into the multilingual processing database, and discloses contents.

A language to be used when reading contents can be automatically or optionally selected.

Said translated information includes game information, picture information, music information, sports information, talent information and auction information. Said advertisement is carried in every page. Said visitor count records the number of times at which contents have been selected in each language.

And a method for providing a multilingual information service by means of a contents database offered by performing multilingual translation through a communication network comprises a step of monitoring and selecting information to be a subject of publication, a step of translating selected information into many languages, a step of storing the translated information into said contents database, a step of registering in advance a person who desires to read the information, and a step of enabling only the pre-registered persons to read the information. A password is issued to said pre-registered person and said information reading is made possible by entering the password. A charge for said reading is automatically charged each time a requested page is read. Said translated information includes medical science information, computer information and entertainment information.

A multilingual information service communication system of the present invention is a multilingual communication system performing and providing translation in many languages through a communication network, said communication system comprising a multilingual translation Web site apparatus which functions as a Web site composed of one apparatus and one translation processing system connected to a communication network and performs a multilingual translation, a plurality of translator apparatuses for performing translation in many languages, and a plurality of translation requester apparatuses for requesting the multilingual translation Web site apparatus side of translation, wherein said multilingual translation Web site apparatus receives language data of a subject of translation from a translation requester apparatus, changes its processing form adaptively to the language of the subject of translation which the multilingual translation Web site apparatus has received, and automatically selects language data for translation, and wherein said translator apparatus performs translation of language data received from said multilingual translation Web site apparatus, and said multilingual translation Web site apparatus receives the translated data from said translator apparatus and enters them into a multilingual translation processing database and automatically changes its translation processing form adaptively to the language after translation, and said translation requester apparatus receives the translated data.

In a multilingual communication system performing and providing translation into many languages through a communication network, said Web site apparatus judges a desired language on the basis of a request from a customer's Web site and provides information in a language selected from said multilingual database. Said multilingual Web site apparatus has a database server connected to it, and this database server has a master Web site portion for processing master contents consisting of language data and/or non-language data, a multilingual processing database and a contents language database. A Web server for settling a translation fee, an advertisement charge and an access registration charge between said multilingual Web site apparatus side and a translator apparatus side, an advertiser apparatus side, an access registered person apparatus side and/or between the multilingual Web site apparatus side and a terminal side is further provided. Said communication network is a public wire communication network or a public radio communication network or a non-public wire communication network or a non-public radio communication network under a TCP/IP environment.

Further, according to the present invention, a method for performing a virtual trade fair and exhibition translated into many languages through a communication network, comprising a step of translating information into many languages, a step of entering the translated data into a multilingual processing database, a step of carrying the translated trade fair and exhibition information, a step of counting visitors to a trade fair and exhibition information site in each language, and a step of performing these steps through one Web site consisting of one apparatus and one translation processing system is provided.

Said translated trade fair and exhibition information is information of a trade fair and exhibition to be held in various countries in the world, said information being formed out of pictures, graphics, characters and sounds.

Said trade fair and exhibition information is formed into a tree structure in which trade fair site information, trade fair and exhibition information, information of exhibiting companies and groups, and advertisements are translated into many languages and the respective pieces of information are linked with one another in the form of a tree.

Said visitor count of visitors to a trade fair and exhibition records the number of times at which said trade fair and exhibition information requested by a terminal device has been transmitted to the said terminal apparatus.

In said trade fair and exhibition information offered through a communication network, information composed of pictures, sounds, graphics and characters of the said exhibition or trade fair generated in another exhibition site or trade fair site can be immediately read by a terminal apparatus through a high-speed Internet communication circuit.

Said immediate information of a trade fair and exhibition is read in a place of a specific city, a trade fair site and an exhibition site.

An information recording medium of the present invention is formed out of an information recording medium storing in it a program for enabling a substantial computer to control a process of receiving language data of a subject of translation through a communication network, a process of changing its processing form adaptively to the language of a subject of translation requested, a process of automatically selecting language data for translation, a process of performing a translation transferred through the communication network, a process of entering the translated data into a multilingual processing database, a process of automatically changing its translation processing form adaptively to the language after translation, a process of enabling a requester side to receive the translated data through the communication network, a process of disclosing multilingual contents, a process of charging a charge for reading of a registered user, a process of counting visitors who have visited a Web page in each language, and a process of demanding an advertisement charge from an advertiser.

Further, an information recording medium of the present invention is formed out of an information recording medium storing in it a program for enabling a substantial computer to control a process of receiving language data of a subject of translation through a communication network, a process of changing its processing form adaptively to the language of a subject of translation requested, a process of automatically selecting language data for translation, a process of performing a translation transferred through the communication network, a process of entering the translated data into a multilingual processing database, a process of automatically changing its translation processing form adaptively to the language after translation, a process of enabling a requester side to receive the translated data through the communication network, a process of disclosing multilingual contents, a process of counting visitors who have visited a Web page in each language, and a process of demanding an advertisement charge from an advertiser, and a process of disclosing immediate information composed of pictures, sounds, graphics and characters through the Internet.

An information recording medium of the present invention further stores in it a program for enabling a substantial computer to control at least one of a process of generating language data and image data being non-language data by means of a template, a process of converting language data contained in image data from a text form into a binary form and replacing the text-form data with the binary-form data, a process of giving a page record and a text record as contents information for processing each page in a multilingual processing database, and a process of judging whether or not characters to be obtained after translation can be accommodated in a storage area of the maximum number of characters through computing the number of characters after translation relative to the number of characters of a language before translation.

Such a method for performing a multilingual information service through a communication network and a communication system and information recording medium for the same method make it possible to perform an information communication service in many languages by means of one Web site (a single Web site/firmware) consisting of one apparatus and one processing system on a communication network and suppress its enlargement in processing scale and apparatus scale.

BEST MODE FOR CARRYING OUT THE INVENTION

Next, a method for performing multilingual translation through a communication network and a communication system and information recording medium for the same method are described in detail with reference to the drawings.

Figure 1:
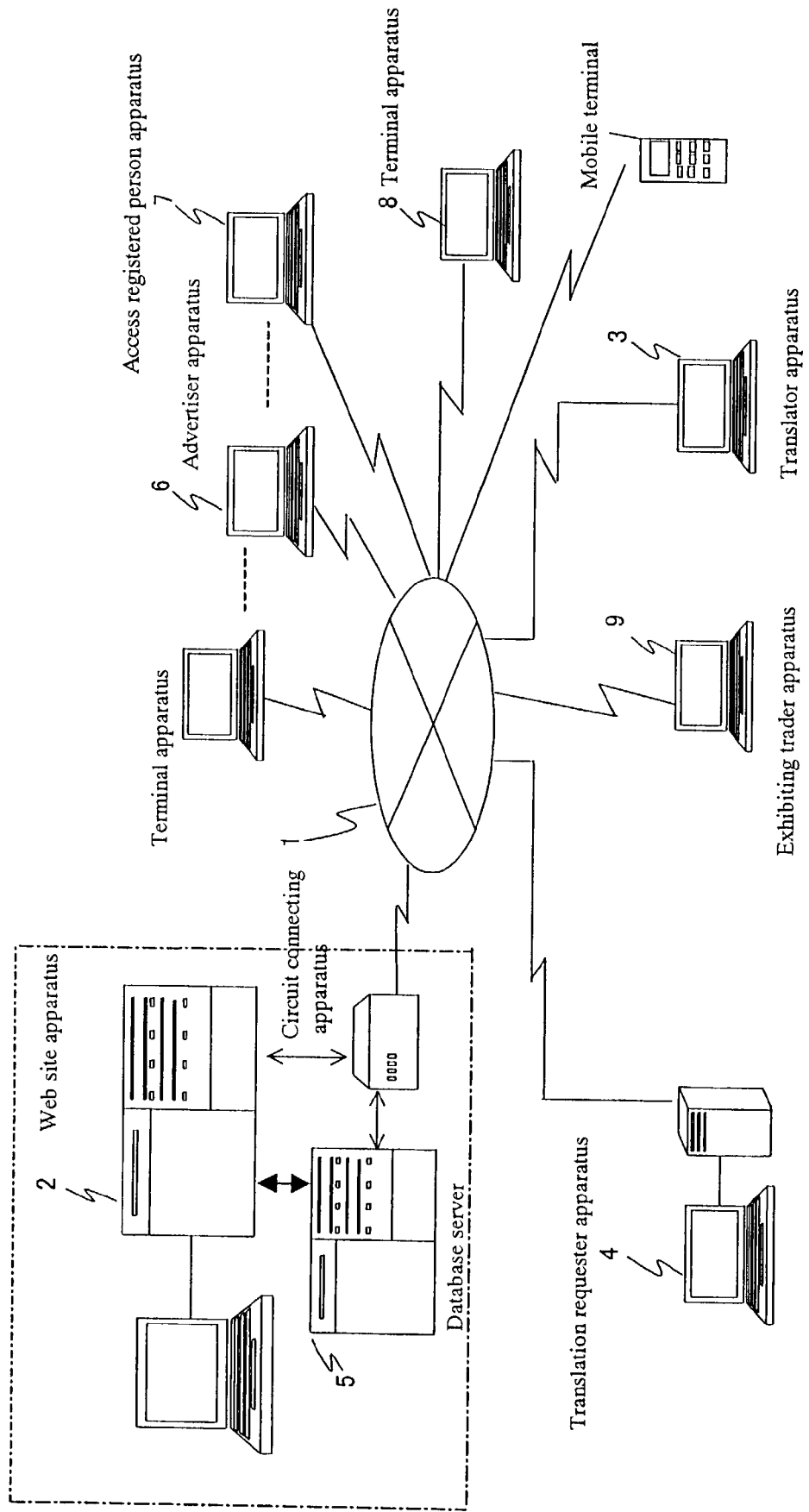
FIG. 1 is a block diagram showing the structure of an embodiment of the present invention.

FIG. 1 is a block diagram showing the structure of an embodiment of the present invention.

In FIG. 1, this example shows a composition example of the Internet under a TCP/IP environment. In this example, a multilingual translation Web site apparatus (platform/Web site) 2 for providing a multilingual translation service through the Internet, a plurality of translator apparatuses 3 for performing translation in many languages, an advertiser apparatus 6, an access registered user apparatus 7, a terminal apparatus 8 and an exhibitor apparatus 9 are connected to a digital signal communication network 1 such as ISDN (Integrated Services Digital Network) or the like. Further, a plurality of translation requester apparatuses 4 for requesting a multilingual translation Web site 2 side of translation through the Internet and a database server 5 for performing a net settlement (electronic commercial transaction) of a translation fee, an advertisement charge and an access registration charge are connected to the digital wire communication network 1.

Translation fees to be settled by a net settlement include a translation fee in case that the translation requester apparatus 4 side requests the multilingual translation Web site apparatus 2 side of translation and a translation fee in case that the multilingual translation Web site apparatus 2 side requests a translator apparatus 3 side of translation. An advertisement charge is an advertisement charge in case that the advertiser apparatus side 6 requests the multilingual Web site apparatus 2 side. An access registration charge is an access registration charge in case that a registered user side 7 requests the multilingual Web site apparatus 2 side.

The digital wire communication network 1 is well known in composition and transmission method as ISDN, and is of a network configuration in which a digital exchange (PBX) is installed in a transmission circuit network.

This example uses a UNIX workstation as the multilingual translation Web site apparatus 2 in FIG. 1 and uses a general-purpose small computer used by an individual translator as the translator apparatus 3 and the registered user apparatus 7. In a translation company and the like, for example, a UNIX workstation system is used.

And this example uses a UNIX workstation as a database server 5 in FIG. 1 and further uses here a general-purpose small computer personally used as the translation requester apparatus 4 and the advertiser apparatus 6. In case that a translation requester is a company or the like, for example, a UNIX workstation system is used.

A general-purpose small computer to be used as the translator apparatus 3, the translation requester apparatus 4 and the registered reader apparatus 7 is of a publicly known composition in hardware. That is to say, it is provided with an interface (I/F) circuit to be connected to a circuit connecting device (digital terminating device DSU, terminal adaptor TA and the like) as well as a microprocessor (MPU) composed of a CPU, a ROM, a working RAM and the like.

And this general-purpose small computer is provided with a reader/writer device for installing a communication protocol and a program for "performing multilingual translation and multilingual information service of the present invention" described in detail in the following and for reading/writing process data through an information recording medium (floppy disk (FD), CD-ROM, detachable memory MS).

Further, this general-purpose small computer is provided with a monitor device such as a color liquid crystal display (LCD) device and an input device consisting of a keyboard and a coordinates input device (mouse, input pad and the like), and is further provided with an input/output (I/O) circuit for performing a data input/output process to the respective portions.

And this general-purpose small computer is provided with a memory for storing process data in it and particularly a multilingual processing database using a hard disk device performing a file process for "performing multilingual translation and multilingual information service of the present invention", and is provided with an I/F circuit for performing drive-connection with a printer and the like.

The multilingual translation Web site apparatus 2 and the UNIX workstation of the database server 5 in FIG. 1 are publicly known in hardware composition. This UNIX workstation system is provided with a circuit connecting device comprising a DSU, a router and the like, a Web server being a main computer for performing a basic communication process and a database. And this UNIX server system is generally provided with also an edition server for reediting such distributed data as graphics, characters and the like adaptively to application (for example, an i-mode mobile telephone).

And such a UNIX workstation is provided with an interface circuit for installing a firewall application into a Web server and connecting an electronic mail/image (FAX) server or a general-purpose small computer. Further, a configuration in which such a UNIX workstation is provided with a LAN server for performing a sequence in this apparatus, an FTP server for performing an FTP (File Transfer Protocol) file transfer, an interworking function (IWF) server for processing connection on the Internet or the like and a Web server dedicated to executing a firewall application for prevention of invasion, and the like is publicly known. In addition to these configurations, the UNIX workstation is provided with a reader/writer device for installing a communication protocol and a program for "performing multilingual translation, multilingual information service and a virtual trade fair and exhibition in many languages of the present invention" through an information recording medium and reading/writing process data, and a multilingual processing database and a contents language database performing various kinds of file processes (data storage and retrieval/multilingual processing database engine using a relational system or network system) for "performing multilingual translation, multilingual information service and a virtual trade fair and exhibition in many languages of the present invention".

And in addition to this configuration, the database server 5 is generally provided with a DNS server used for a distributed name management system (DNS: Domain Name System) and an SSL server for performing an encryption communication protocol (SSL: Secure Sockets Layer) used in an encryption transmission for various kinds of security protection.

Such a Web server under a TCP/IP environment is implemented as a multifunctional apparatus by using a computer and having a communication protocol and a program installed in it. And the Web server has the same composition as a general-purpose small computer, and may be changed in architecture adaptively to said "performance of multilingual translation, multilingual information service and a virtual trade fair and exhibition in many languages of the present invention".

In this case it is enough to make its composition in consideration of traffic volume in processing a communication protocol and in consideration of the quantity of process data in data processing. For example, such a system may be composed in consideration of a duplexed CPU configuration, disposition of a plurality of multilingual processing databases, use of a mass storage and the like.

Figure 2:
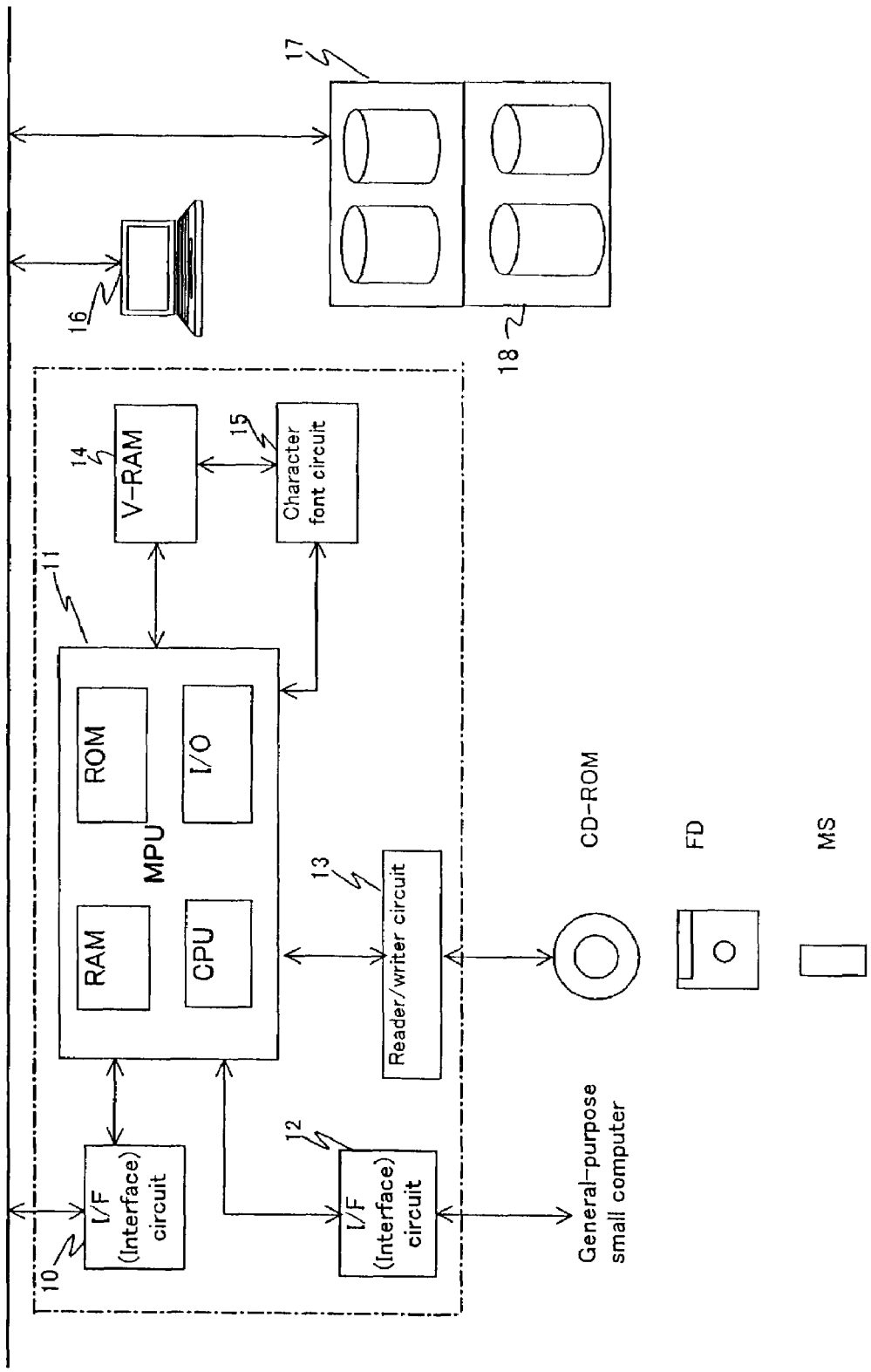
FIG. 2 is a block diagram showing an example of a Web server for carrying out the present invention.

FIG. 2 is a block diagram showing a composition example of a main part of a Web server for carrying out the present invention.

This example is provided with an I/F circuit 10 which is connected to a bus of a UNIX workstation and performs an interface process with another apparatus not illustrated.

And this example is provided with a microprocessor (MPU) 11 to be connected to the I/F circuit 10 and a bus. The microprocessor 11 is composed of a working RAM, a RAM having a boot control program stored in it, an input/output (I/O) circuit, a CPU and the like. The microprocessor 11 is provided with an I/F circuit 12 for connecting with a general-purpose small computer and a reader/writer device 13.

The reader/writer device 13 installs a communication protocol and a program for "performing multilingual translation and multilingual information service of the present invention" through an information recording medium (floppy disk (FD), CD-ROM or detachable memory MS) and reads/writes process data.

Figure 12:
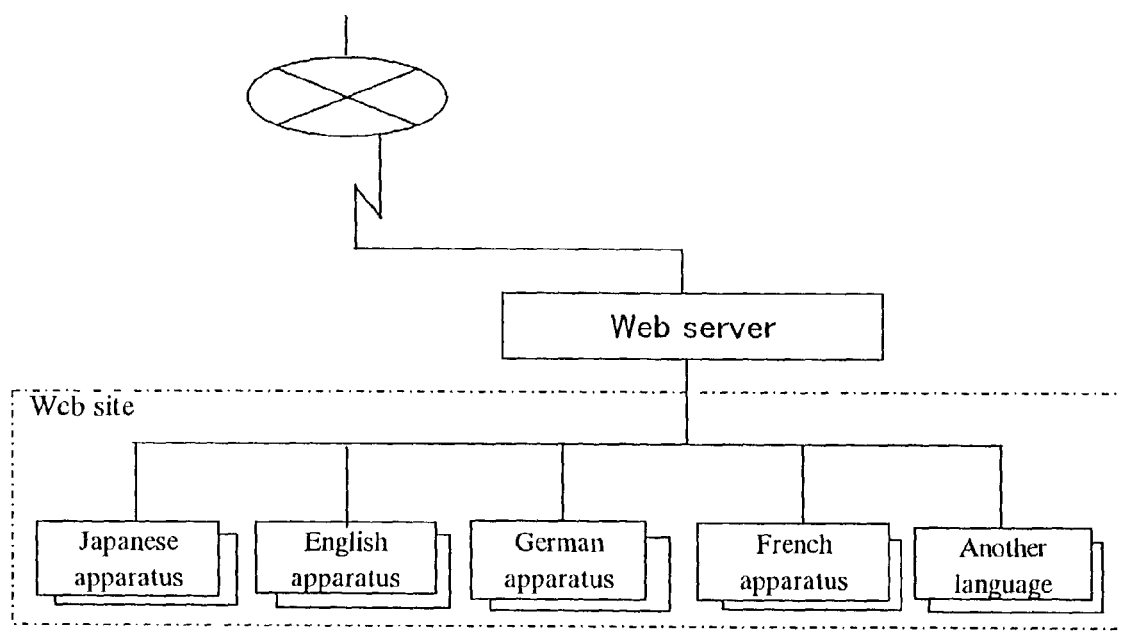
FIG. 12 is a block diagram for explaining the architecture of a conventional Web site for performing multilingual translation.
Figure 13:
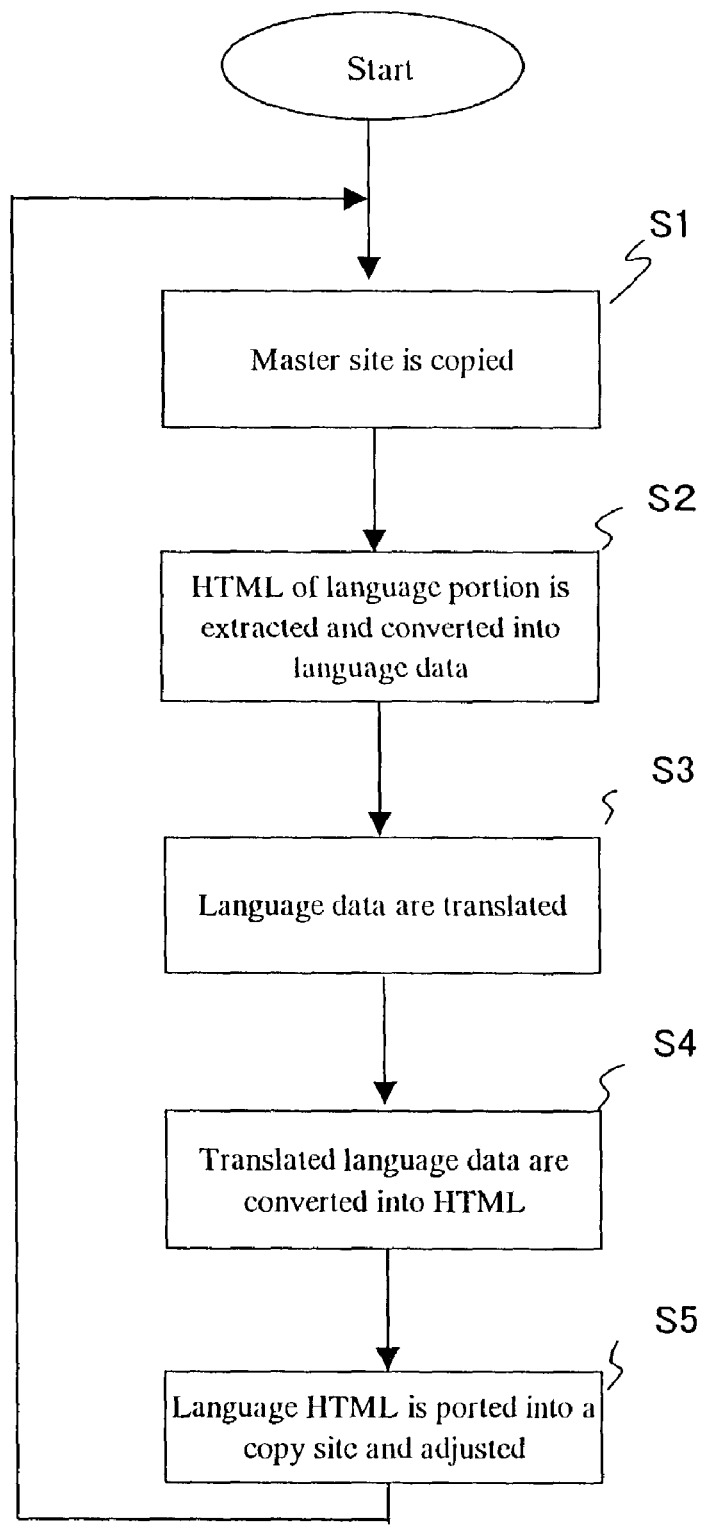
FIG. 13 is a flowchart showing a processing procedure of performing multilingual translation in a conventional example.
Figure 14:
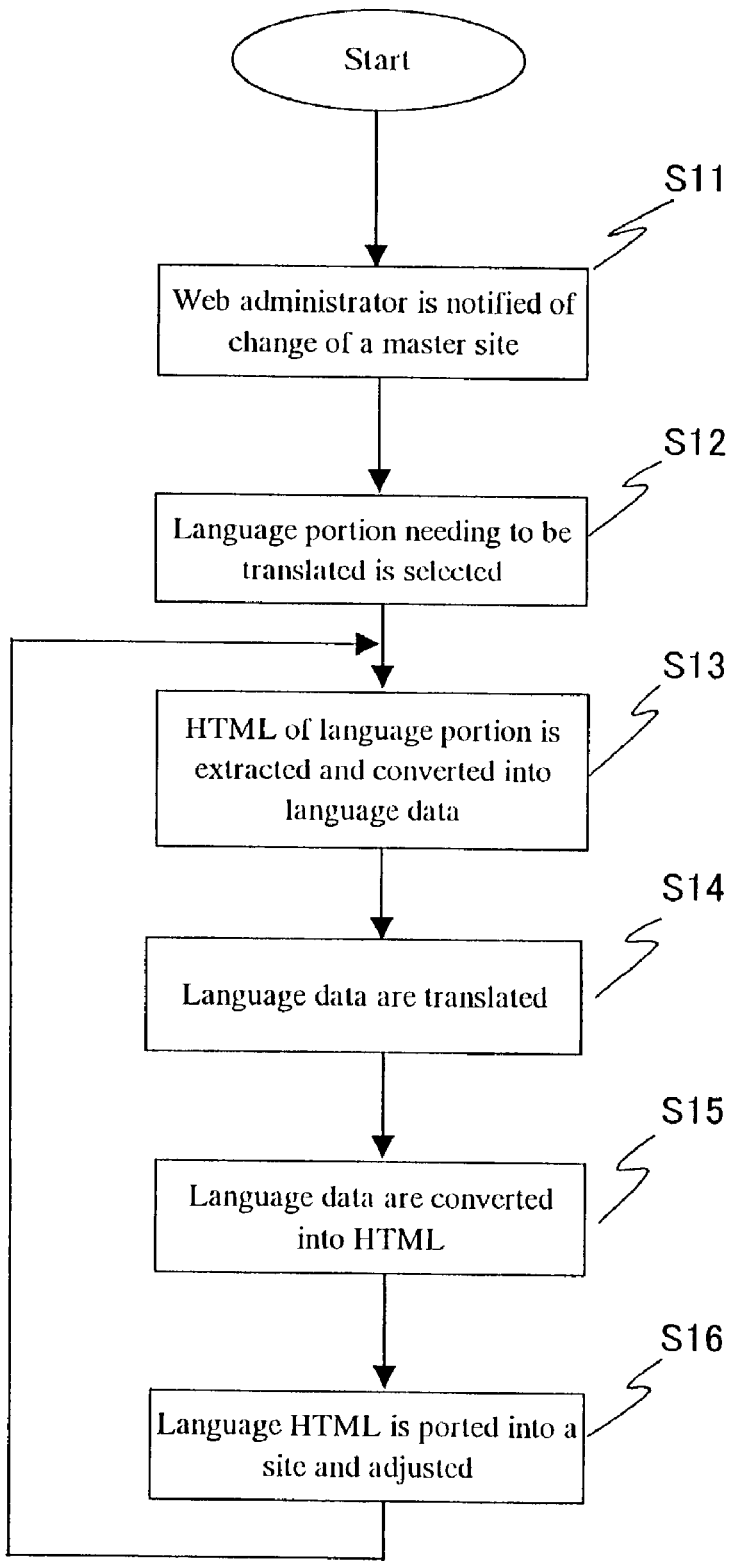
FIG. 14 is a flowchart showing a processing procedure of maintenance of multilingual translation in a conventional example.

And the microprocessor 11 is provided with a video RAM (V-RAM) 14 and a character font conversion circuit 15 for converting/generating the size of characters displayed for each language in many languages. This character font conversion circuit 15 is composed of a RAM and the like comprising a conversion table for converting each language character at a ratio of the smallest font. Conversion/generation of the size of displayed characters of each language is explained in the following (see FIG. 12).

Output of the V-RAM 14 is transferred to a monitor device 16 connected to a bus of a multidrop mode. And the microprocessor 11 performs data processing for "performing multilingual translation of the present invention" with a multilingual processing database apparatus 17 connected to the bus. The multilingual processing database apparatus 17 and the contents language database 18 may be distributively disposed at a remote place.

The multilingual processing database apparatus 17 can be also distributively disposed at a remote place, as described with reference to the following FIG. 11.

Next, the process and operation of this embodiment are described.

First, an application (communication protocol and program) for communication operation of each device in FIG. 1 is explained.

Each apparatus shown in FIG. 1 performs a communication connecting process by means of TCP/IP publicly known as an Internet communication, a language processing function (writing and speech processing, JPEG static image processing or MPEG dynamic image processing by means of data compression) by a language such as HTML (Hyper Text Markup Language), XML (eXtensible Markup Language) and the like, transfer by means of a hyperlink function, a two-way communication by means of HTTP (Hypertext Transfer Protocol), file transfer by FTP, and an external application by means of CGI (Common Gateway Interface). Each apparatus is equipped with a Web browser (application) for performing an electronic mail communication and Internet surfing for this purpose.

In FIG. 1, each apparatus performs a file transfer by publicly known IP packets in two-way communication through a TCP/IP link. Such a transfer process on the Internet is performed by an object pointing operation in HTTP (object pointing to a radio button, anchor, push button or the like by a coordinates input device such as a mouse or the like: commonly called "click"). In this case, an end description character (FIN) of opening of a TCP connection, an acknowledgement character (ACK) and the like are stored in a file format, and a file transfer is performed through identification of them, but description of them is omitted in the following description.

Next, the digital wire communication circuit network 1 shown in FIG. 1 is described in transmission form.

The digital wire communication circuit network 1 shown in FIG. 1 transmits IP packets at transmission rates of 64 kbits/sec, 384 kbits/sec and 1.5 Mbits/sec, for example.

At a transmission rate of 64 kbits/sec, it performs a "2B+D (information channels of 32 kbps X 2+control channel of 16 kbps)" transmission through a packet switching procedure X.31 (I.430/I.431, Q.921/Q.931, X.25 Protocol) by ITU-T Recommendations.

It is acceptable also to apply another high-speed transmission method (asymmetric digital transmission, for example) and to apply a high-speed communication method (gigabit high-speed data communication method, for example).

And since a general-purpose small computer for the translator apparatus 3 and the translation requester apparatus 4 shown ing FIG. 1 performs a well-known operation, description of it is omitted.

Further, a UNIX workstation for the multilingual translation Web site apparatus 2 in FIG. 1 performs a sequence for "performing multilingual translation and multilingual information service of the present invention" through a Web server, a LAN server and the like.

For example, it performs its electronic mail communication or Internet surfing through performing the respective sequences of a CSMA/CD random access method similar to an Ethernet LAN or the like and an RPC (Remote Procedure Call) remote call.

The general-purpose small computer or UNIX workstation performs "a method for performing multilingual translation, multilingual information service and a virtual trade fair and exhibition in many languages of the present invention" by means of a communication protocol and a program executed by a CPU (including also a CPU of the Web server).

These communication protocol and program are installed into each apparatus together with said general-purpose communication protocol and program in combination with a communication protocol and program specialized in "performing multilingual translation, multilingual information service and a virtual trade fair and exhibition in many languages of the present invention". These "performance of multilingual translation and multilingual information service, and performance of a virtual trade fair and exhibition in many languages of the present invention" are provided as an information recording medium (FD, CD-ROM or detachable memory for example) having its program stored in it. In other words, it is offered as a general-purpose package capable of being on the market.

Next, "performance of multilingual translation of the present invention" based on the operation of each apparatus is described. First, an outline of "performance of multilingual translation of the present invention" is explained.

Figure 3:
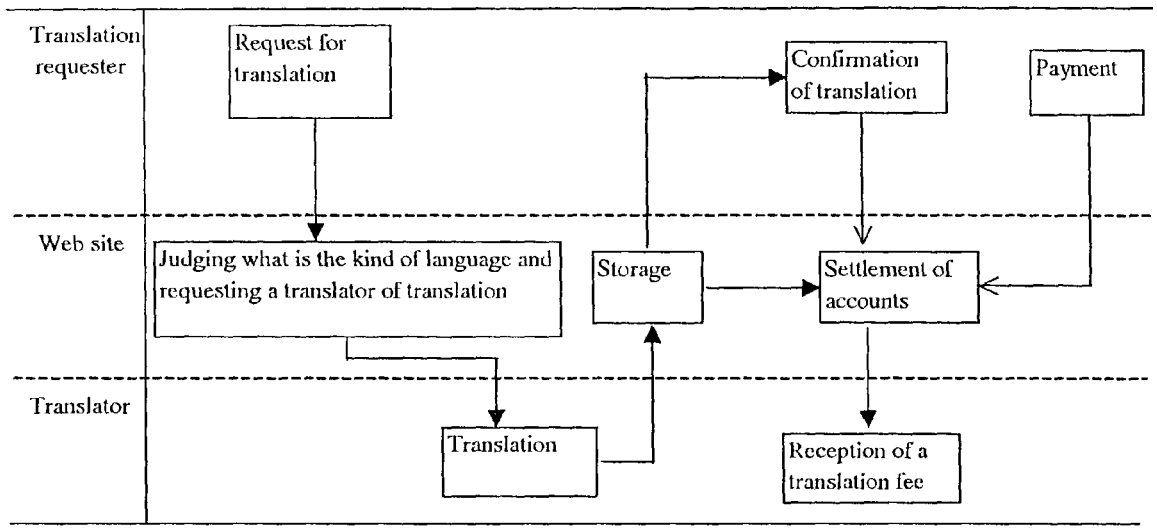
FIG. 3 is a sequence diagram showing an outline of performance of multilingual translation of the present invention.

FIG. 3 is a rough sequence diagram of "performance of multilingual translation of the present invention".

Referring to FIG. 3, the multilingual translation Web site apparatus 2 takes in a translation request from a translation requester apparatus 4 through an electronic mail or a Web site (home page/HTTP) opened to the public by the multilingual translation Web site apparatus 2 through the digital wire communication circuit network 1. The language of received information is one of many kinds of languages (Japanese, for example).

Therefore, a general-purpose Web browser which the multilingual translation Web site apparatus 2 is provided with cannot read such a language on occasion. Therefore, a Web browser of an application capable of reading many languages is installed.

For example, an application for performing judgement by tracking a language possible to be transferred is installed in advance. This tracking is to compare a part of a transferred character string with character strings of many languages stored in advance. And like "cookie", its language is judged by identifying that it is a former visitor to the home page.

It is acceptable to identify a navigation language or navigation browser language returned by the installed Web browser.

Next, the multilingual translation Web site apparatus 2 transfers a manuscript for translation requested together with the time limit of delivery and special notes to a translator apparatus 3 side capable of performing translation between languages specified by the translation request. This is performed through a "multilingual translation network" in which translators performing translation in many languages are organized on the Internet.

Next, the translator apparatus 3 side performs translation between the specified languages. In this case, a translator installs a translation software into a general-purpose small computer of the translator apparatus 3 and performs its machine translation, or performs a manual input translation by means of a word processor software and makes a translation writing by its electronic data and transfers it together with a bill to the multilingual translation Web site apparatus 2.

In case that a translator apparatus 3 performs an automatic machine translation, the translator apparatus 3 performs a translation application of the multilingual translation Web site apparatus 2 through CGI or installs a translation application in it and performs the translation application in a stand-alone state. And the multilingual translation Web site apparatus 2 side may perform an automatic machine translation and then transfer its translation writing to a translator apparatus 3, and may have a translator brush up the translation including examination.

The multilingual translation Web site apparatus 2 stores the transferred translation writing electronic data into a multilingual processing database (the multilingual processing database apparatus 17 in FIG. 2). After this, an electronic transaction settlement (transfer of fund) to this translator (translator apparatus 3) using a debit card or the like is performed between the database server 5 and the multilingual translation Web site apparatus 2 to pay a translation fee to the translator (translator apparatus 3).

After this, the multilingual translation Web site apparatus 2 notifies the translation requester apparatus 4 side of the completed translation writing together with a bill through an HTTP link with an electronic mail or the Web site (home page). After this notification, the translation requester apparatus 4 side inputs an identification code ID and a password specified at the time of notification into the multilingual translation Web site apparatus 2, and receives and stores the completed translation electronic data into the multilingual processing database.

In such a way, it is possible to perform multilingual translation by means of one Web site (a single Web site) consisting of one apparatus and one translation processing system, and to suppress the enlargement of its processing scale and apparatus scale.

Figure 4:
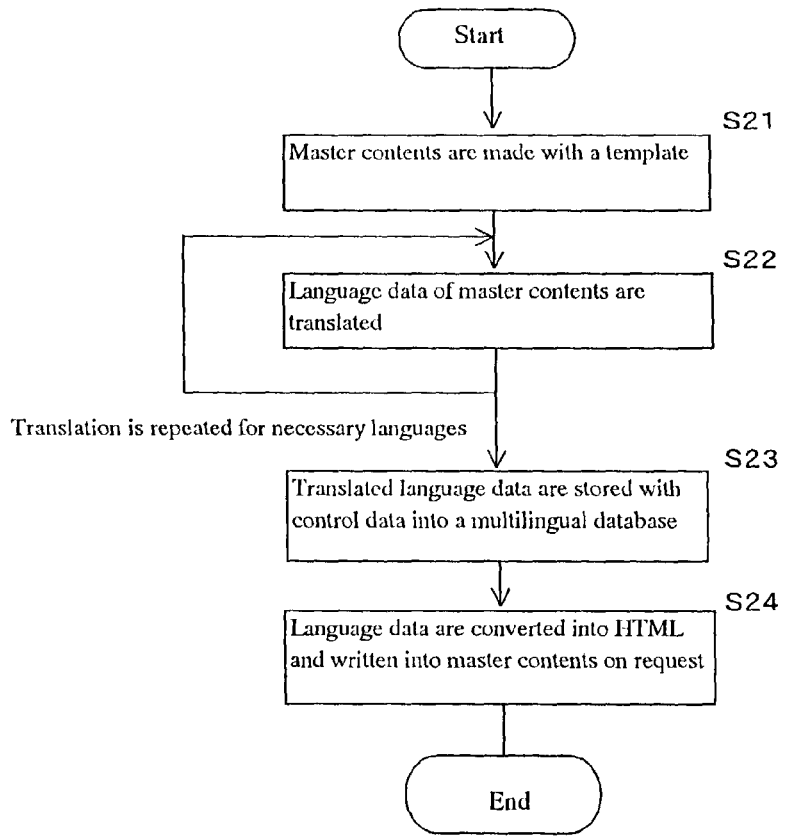
FIG. 4 is a flowchart showing a processing procedure of multilingual translation by a functional composition of the present invention.

FIG. 4 is a flowchart showing a procedure of performing a multilingual translation, and in FIG. 4, master contents are generated by means of a template (step S21).

Next, language data in the master contents are translated (step S22). Routines for the processes in steps S21 and S22 are repeated for necessary languages. Next, the translated language data are stored together with control information into the multilingual processing database (step S23). Further, the language data are converted into HTML data and the converted data are written into the master contents on request (step S24).

Next, a multilingual processing database is described.

Figure 5:
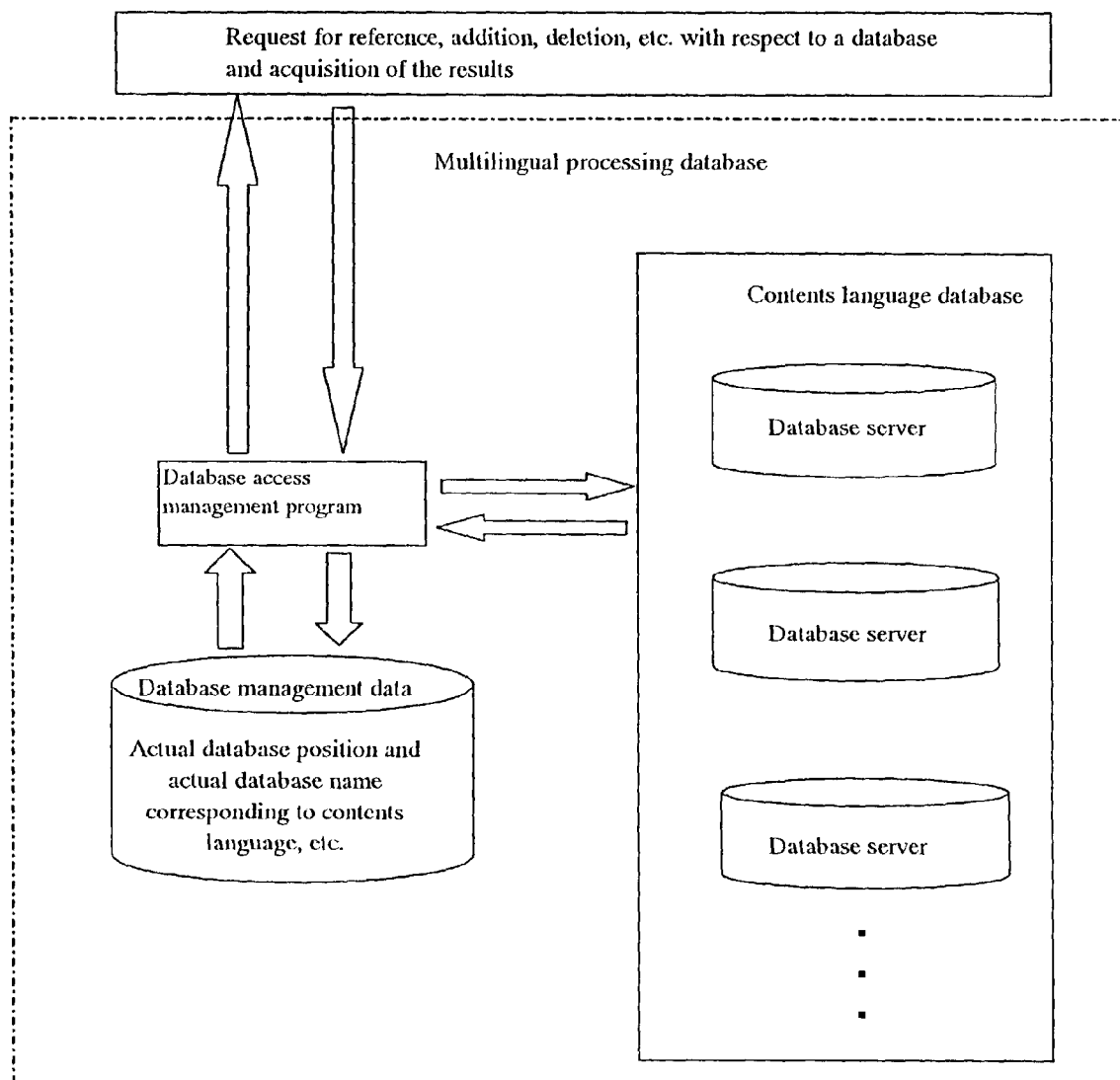
FIG. 5 is a block diagram for explaining a process in a multilingual processing database in the embodiment.

FIG. 5 is a block diagram for explaining a process in a multilingual processing database (multilingual processing database apparatus 17 in FIG. 2).

In FIG. 5, the multilingual processing database performs its data processing by executing an access management program. This data processing requests reference, addition, update, deletion and the like with respect to the multilingual processing database, and acquires their results by means of the access management program.

And database management data are exchanged by executing the database access management program. These database management data are an actual multilingual processing database position and an actual multilingual processing database name corresponding to a contents language and the like. And data are exchanged with a contents language database by executing the database access management program. This contents language database is composed of a plurality of database servers.

In such a way, the multilingual processing database is provided with a plurality of servers, which can be distributively disposed. The database acquires an actual server name, server position, multilingual processing database name and the like from database management data in response to a request for a language ID, page ID and the like, and accesses a multilingual processing database desired out of database servers.

Figure 6:
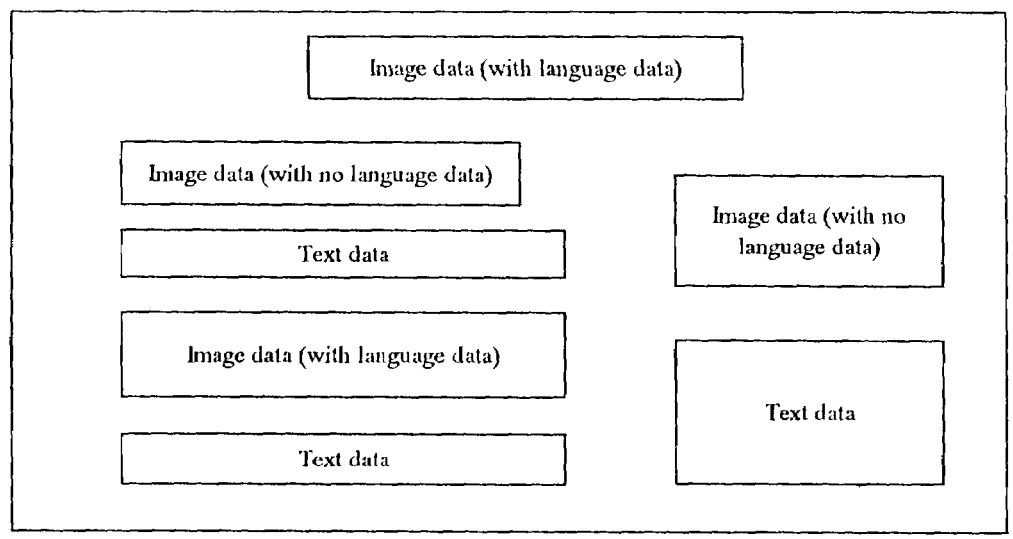
FIG. 6 is a diagram for explaining generation of master contents by means of a template in the embodiment.

FIG. 6 is a diagram for explaining generation of master contents by means of a template. In FIG. 6, these template includes template used for automatically selecting image data (containing language data), image data (containing no language data) and text data, respectively. There are plural pieces of image data (containing language data), plural pieces of image data (containing no language data) and plural pieces of text data, said plural pieces of data being respectively different in data quantity from one another.

Language data are automatically selected by means of such a template.

Further, with reference to FIG. 6, translation of language data in an image, the ratio of the smallest font capable of being displayed in a home page, and the change in number of characters after translation are described.

(a) In Case of Translating also Language Data in an Image

Such language data in an image are dealt with in the same way as "alt" (which is converted from a text form into a binary form).

The process of modifying language data in an image is a human work. A process of replacement or the like is dealt with in the same way as text record data.

(b) Ratio of the Smallest Font Capable of Being Substantially Displayed (in a Home Page) According to Languages The ratio of the smallest font is determined in advance in a table (a character font conversion circuit 15).

The ratios of English "0.8", German "0.8", . . . , Chinese "1.1" are respectively set to Japanese "1". These correspond to the degrees of complexity of characters of the respective languages.

The maximum number of characters of a text data record is associated with a language ID on the basis of these ratios.

(c) Change in Number of Characters from an Original Language before Translation to a Destination Language After Translation The ratio of change depending on languages is derived, for example, from experience of translation. The number of characters in a language alter translation is obtained by means of a table having these ratios stored in it. The ratios of English "1.3", German "1.3", . . . , Chinese "0.8" are respectively set to Japanese "1".

These correspond to differences in writing volume depending on characters written in the respective languages.

In master contents, a storage area is secured (set) according to the expected maximum number of characters, but when the following process is additionally performed, the maximum number of characters is securely dealt with.

First, it is judged whether or not the number of characters in a destination language after translation, said number being obtained by computation relative to the number of characters in an original language before translation, falls within the maximum number of characters. That is to say, in case that said number falls within the maximum number of characters, the translation is performed, and in case that said number does not fall within the maximum number of characters, the number of characters in the original language before translation is reduced as modifying the writing so that its meaning does not change. This modification is a human work.

Next, another embodiment of the present invention being in combination with a mobile communication network is described. Although the above-mentioned embodiment has only a fixed communication network (digital wire communication circuit network 1, fixed general-purpose small computers and the like) arranged in it, but can be applied also to a mobile communication network as it is. For example, it can be applied to a case that a translation requester apparatus 4 side requesting a translation needs translation in various explanations at a place (a foreign company, for example) where it has come, performs a translation request from this place and instructs transfer of the translated writing to this foreign company.

A mobile communication network can be applied also to a multilingual translation Web site apparatus 2 and a translator apparatus 3 other than the translation requester apparatus 4 as it is.

Figure 7:
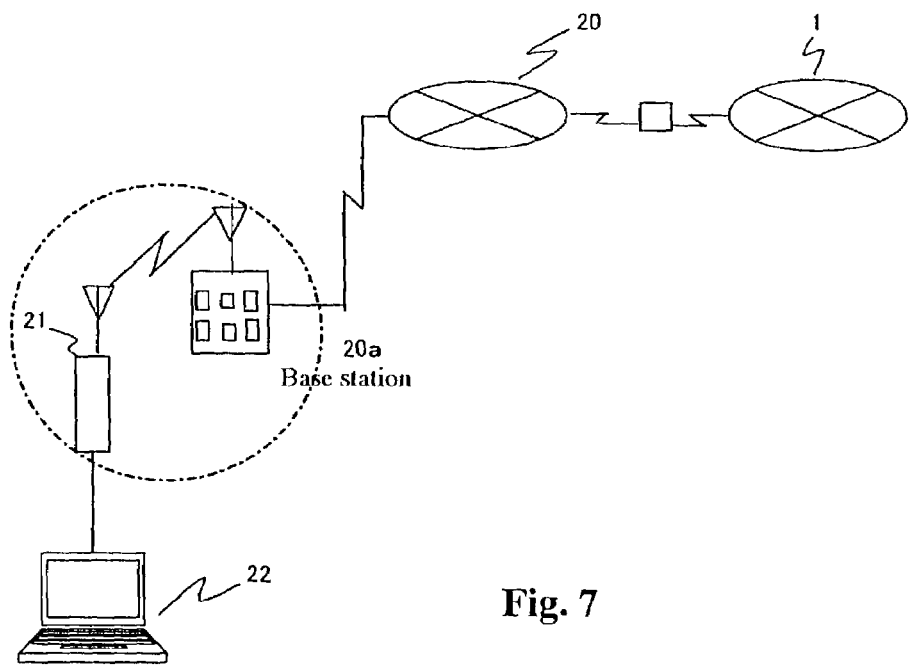
FIG. 7 shows a block diagram showing the configuration of a main part of a mobile communication network.

FIG. 7 shows an example of a block diagram of the configuration of a main part of a mobile communication network.

This example comprises a digital mobile communication circuit network 20 of a PDC (Personal Digital Cellar Telecommunication System) method, a PHS (Personal Handyphone System) method and the like connected by a connection device (gateway device or PHS connection device) for performing a communication protocol conversion and the like with the digital wire communication circuit network 1 shown in FIG. 1, and a mobile terminal 21 as a radio communication means to be connected with a cell base station 20a through a radio channel. The mobile terminal 21 has a mobile computer 22 connected to it.

This mobile terminal 21 is of an ordinary composition which comprises, for example, a transmitter/receiver part, modulator/demodulator part, time-division multiplexer part, Codec (coder/decoder) part, CPU, frequency change synthesizer, reception field strength (RSSI) detector part, external device connection interface part, incoming indicator light emitting diode, keypad, liquid crystal display device, incoming indication vibrator and the like. The mobile computer 22 is also of a similar composition to a general-purpose small computer of the translator apparatus 3 and the like in FIG. 1.

A method of transmission between the digital mobile communication circuit network 20 and a mobile terminal 21 may be any of a TDMA (PDC) method, TDMA/TDD (PHS) method and CDMA method (IS-95/IMT-2000), and its modulation method (PSK method or the like) is not limited in particular. The digital mobile communication circuit network 20 and a mobile terminal 21 communicate with each other through a digital mobile communication circuit network 3 by means of a radio interval (air interface) of ARIB-27/28 standard (PDC method/PHS method), for example. It is preferable to apply the PHS method which can perform a broad-band transmission which is fast in data transfer rate in the present state and makes it easy to access the Internet by means of the PIAFS (PHS Internet Access Forum Standard) method to this communication.

These mobile terminal 21 and mobile computer 22 perform "performance of multilingual translation of the present invention" described above through the digital mobile communication circuit network 3.

In this embodiment, a variation example as described in the following is also possible. The digital wire communication circuit network 1 may use an analog telephone network PSTN (Public Switched Telephone Network), and as a circuit connection device in this case, an NCU (Network Control Unit) and a modulator and demodulator (modem) may be used.

And the present invention can be also implemented by using a digital wire communication circuit network 1 in combination with a computer-to-computer communication using a communication protocol such as Z/YMODEM and the like in place of the TCP/IP transmission method. And each apparatus of FIG. 1 may be formed into a duplex configuration composed of a current system and a spare system in consideration of improving its transmission reliability and preventing loss of stored data on the Internet.

Additionally, the present invention is implemented by utilizing the publicity (utilization by many unspecified persons) on the Internet, but can be applied also to a closed communication network being not opened to the public such as a company's Ethernet LAN, WAN (Wide Area Network) having FDDI-LAN, and the like as it is.

And these embodiments have been described under the assumption that a program is installed by means of an FD (floppy disk), CD-ROM or detachable memory, but such a program can be also installed by download through the Internet, for example.

Up to here, a method for translating a piece of contents into many languages according to the present invention and an apparatus and communication system for the same method have been described. Next, an information service according to the present invention is described. First, the structure of a translation organization for multilingual translation is described.

Up to now, a Web site operator ordinarily translates and carries necessary contents on its Web. This method limits translatable languages. Accordingly, contents to be opened to the public are limited to contents which can be translated by its own company.

A function of networking the world being a feature of communication through the Internet is not utilized. In order to enable people of many countries to read Web screens in their own languages on the Internet, the present invention builds a network for translating a piece of master contents into many languages. The present invention builds a "multilingual translation franchise organization" making it possible to perform translation in the respective languages at any time by calling out and franchising not only Japanese translators and translation traders but also foreign translators and translation traders.

Contents to be translated are disclosed through a communication means such as the Internet and the like. A translator takes in and translates the disclosed master contents into his/her registered language. The translator performs translation using a template and can make the translated writing be standardized in number of characters and in form. This translation method is as described above. Therefore, translated contents can have the same form in any language. Thus, translated contents are sent to a Web site through a communication network, edited and stored into a contents database, and come into an available state. An environment in which stored contents can be accessed in one's native language from terminals all over the world on the Internet results in being built.

A Web application for providing an information service according to the present invention activates a program through a CGI (Common Gateway Interface). In this method, a user terminal specifies a URL with an argument from a browser.

A Web server activates a relevant CGI program and receives its result and then transmits it as an HTML document to a client terminal.

And a user side terminal apparatus may be either a mobile-type terminal (mobile telephone, for example) or a personal computer ordinarily used only if it is a device adapted to a Web supporting HTTP and HTML used in the Internet.

A method for providing a trade fair and exhibition information service by means of multilingual contents according to the present invention is described on the basis of the above-mentioned method for performing a multilingual information service.

Figure 8:
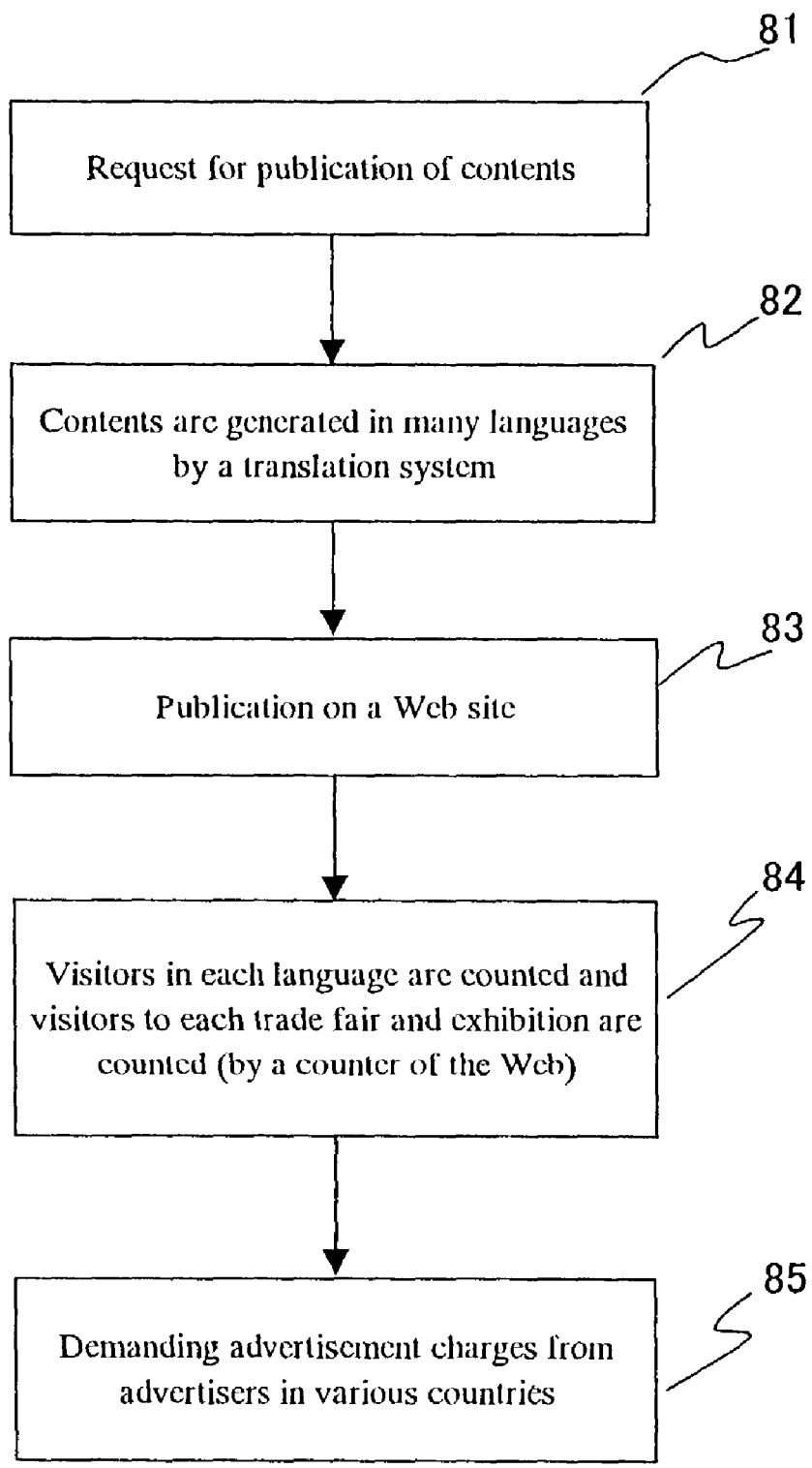
FIG. 8 shows a flowchart of a procedure from a step of requesting contents to be published to a step of demanding an advertisement charge as an embodiment of the present invention.

FIG. 8 is a flowchart showing a procedure from a step of carrying multilingual information service contents, trade fair and exhibition information service contents to a step of demanding an advertisement charge from an advertiser. First, contents containing an advertisement which is requested to be carried (step 81) are translated into many languages through a translation network (step 82), edited and stored into a contents language database.

These are publicized on a Web site (step 83). A reading request comes to the Web site from various terminals and a language to be used in reading is automatically selected. When a page of an information service of trade fairs, exhibitions, etc. is opened, the number of times of visiting by visitors reading this page is counted for each language (step 84). This is repeated and an advertisement charge according to the number of times of reading for a specified period is calculated, and an advertiser is demanded for its advertisement charge (step 85).

This method is described in detail in the following. Since a network, the Internet and apparatuses have been described above, the description of them is omitted. And the above-mentioned various kinds of information translated into many languages is stored in a contents language database 18. Various kinds of information are offered in a requested language to a requester terminal by using the contents language database 18. A browser software related to reading through the Internet is usually used and publicly known.

An advertisement translated into many languages is displayed on each page of screens.

An advertisement may be in the form of a template. And it may be in a signboard form called a "banner advertisement". This banner form has a structure in which clicking a specified position in an advertisement brings linkage to the home page of its advertiser. In another method, a "mail news advertisement" is inserted in a text form into a text of an electronic mail magazine on the Internet. A URL denoted in a text is colored and displayed in a form capable of being clicked, and when a user feeling interest clicks it the user is linked to the home page of the advertiser. According to the form of an advertisement, one of these methods can be used.

The selection of a desired language is judged from a multilingual information database by a general-purpose Web browser which a multilingual translation Web site apparatus 2 is provided with, but some language may be illegible. Due to this, a Web browser of application capable of reading many languages is installed. For example, an application for judging a language by tracking with languages which may be transferred in advance is installed.

This tracking compares a partial character string transferred with multilingual character strings stored in advance. And like "cookie", its language is judged by identifying that it is a former visitor to the home page. It is acceptable also to identify a navigation language or navigation browser language returned by an installed Web browser.

And as another method, the selection of a language may be automatically performed by the system from a user's own address. Or the display in a desired language may be performed by selecting a displayed language button.

As an embodiment of various information services to be opened to the public, the following information services can be offered. A game site introduces Japanese games and games of various countries in the world. A picture and music site introduces pictures and music in the world, and provides a site for user's contribution. A travel and sight-seeing resort site introduces place information which only local people know and carries original sight-seeing information containing a user's contribution column. A sports site carries the latest information of sports held in various countries in the world. A talent information site provides job offer information and talent information to people of many countries in many languages.

Further, an embodiment of a virtual trade fair and exhibition information service in many languages through a communication network according to the present invention is described. A trade fair and exhibition information service through a communication network forms a trade fair and exhibition in which intending exhibitors all over the world can participate using the Internet. Anyone can take part in an exhibition freely through its own terminal, and additionally can read real-time information also.

Figure 9:
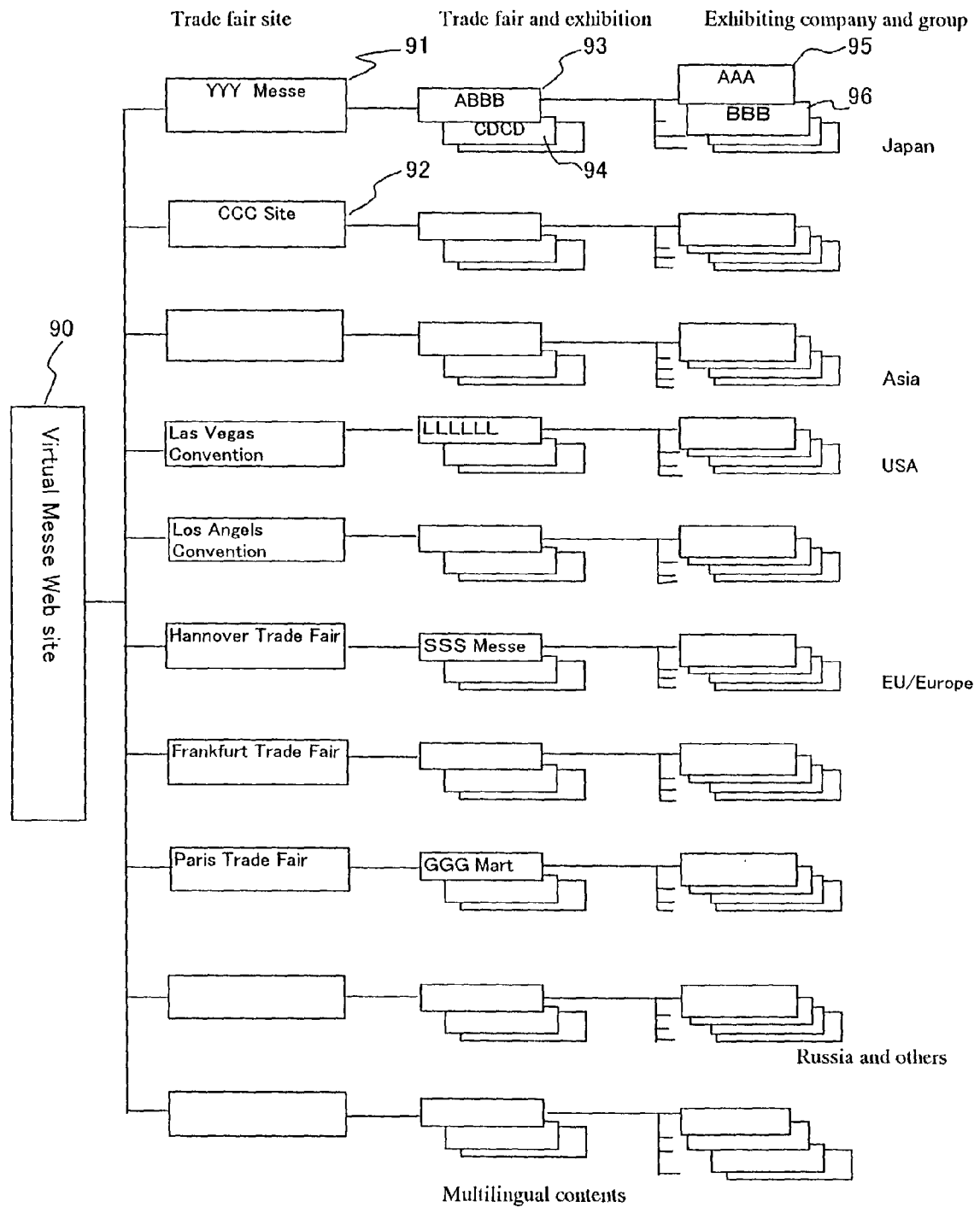
FIG. 9 shows a relational diagram of a file configuration as an embodiment of virtual trade fairs and exhibitions of the present invention.

FIG. 9 is a composition diagram showing an embodiment of a data structure of trade fairs and exhibitions on a Web using many languages. In the present invention, these trade fairs and exhibitions on this Web result in existing on the Web on which there are the sites of trade fairs and exhibitions all over the world. For this reason, the present invention refers to a trade fair and exhibition being in a Web server as a virtual Messe.

Publication of these two pieces of trade fair and exhibition information is described in more detail in the following.

First, as shown in FIG. 9, a virtual Messe Web site 90 according to the present invention is composed of a multilingual Web site in which the sites of trade fairs in various countries, trade fairs and exhibitions to be held and their exhibiting companies and groups are hierachized and linked in a tree form.

For example, exhibitions held in YYY Messe 91 for a certain period are browsed.

The site of exhibitions is YYY Messe, and exhibitions held in YYY Messe are ABBB 93 and CDCD 94. The exhibiting companies of this exhibition are AAA Company 95 and BBB Company 96. Each item is written in HTML and is associated with its relevant items by a hypertext function. In this example, YYY Messe 91 is associated with ABBB 93 and CDCD 94, and ABBB 93 is associated with AAA Company 95 and BBB Company 96.

These items are associated with one another in many languages and stored. And desired contents are displayed by selecting an item to display its screen and clicking an item of contents displayed on each screen.

In a multilingual Web site, trade fair and exhibition data translated into many languages are stored in a database server 5. Since a link is formed in HTML, a visitor at the terminal side clicks a relevant item. The clicking enables the relevant item of the linked destination to be accessed and looked at.

Trade fair and exhibition information is translated into many languages and therefore, a retriever can participate in his/her own language in the publicized trade fairs and exhibitions all over the world. And since an exhibitor exhibits its products not only in its own language but also in many languages, it does not need to explain them in a newly demanded language.

A visitor accessing a virtual Messe can acquire necessary information by following a tree, starting with a trade fair site, a trade fair and exhibition, an exhibiting company or an exhibitor. And a visitor can obtain in its own language its target trade fair and exhibition information by following the tree from each exhibitor. The contents of a trade fair site contain such items for contact as an address, telephone number, Web address and the like, and such items as the schedule, the gist and the like of the trade fair and exhibition.

And the contents of a trade fair and exhibition site may be made so as to link to the company's home page in HTML to provide more detailed information.

The contents of an exhibiting company or group contain such items for contact as the company's name, address, telephone number, Web address and the like, and such company attribute items as its business items. And these contents have a future exhibition plan, new product information and the like of the company, and are also linked by means of HTML so as to link to the company's home page or meet a customer's request such as a request for a catalog and the like.

Thus, a reader can visit trade fairs and exhibitions in all the world at any time in the twenty four hours, and can obtain information such as contents exhibited in an exhibition, the opening schedule of it and the like. And an exhibitor can inform many people in the world of its own exhibited contents. Further, an exhibitor can explain its own booth in many languages by installing an Internet terminal in an actual exhibition site.

Figure 10:
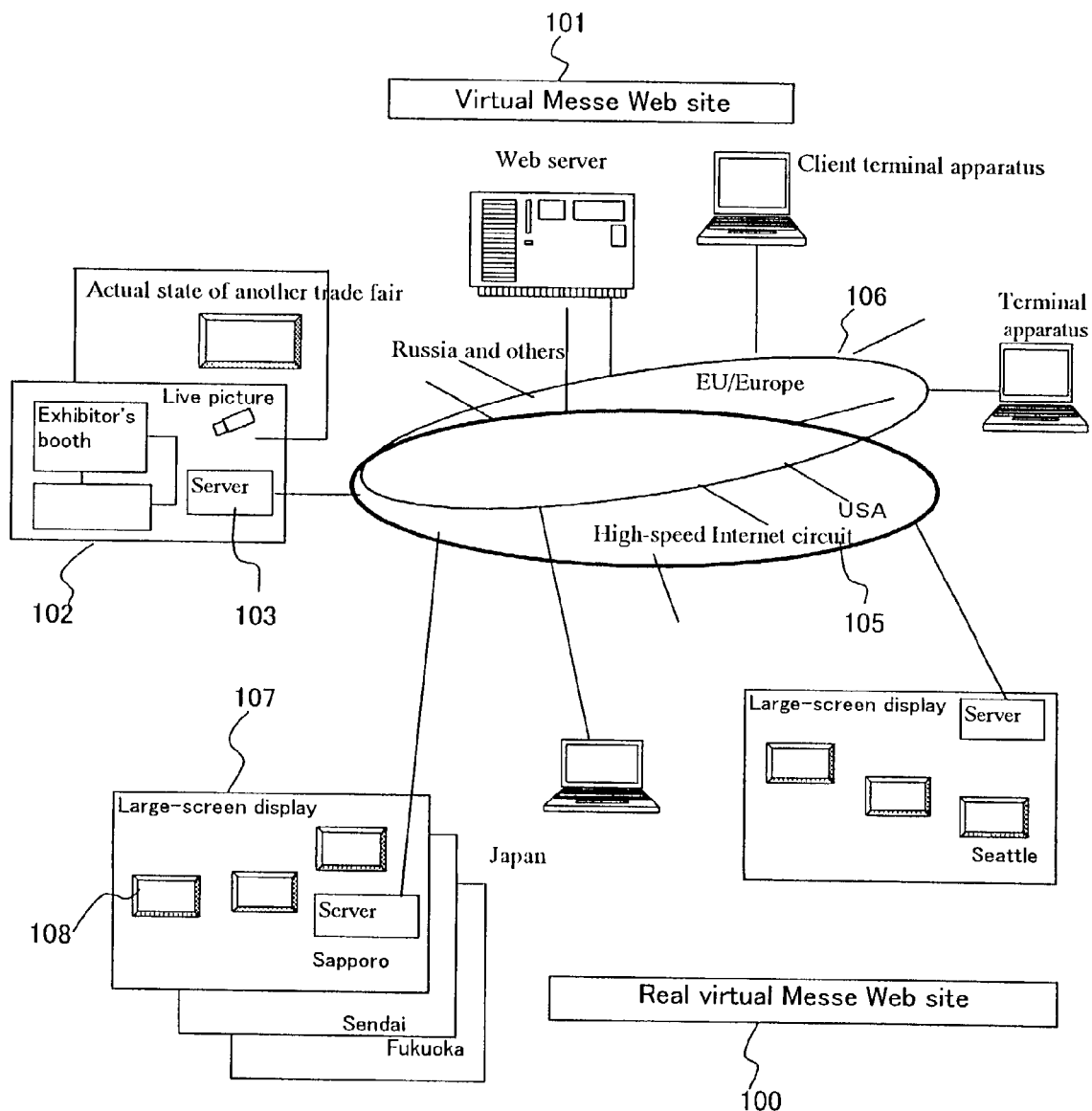
FIG. 10 shows an embodiment example using the Internet of a virtual trade fair and exhibition of the present invention.

Furthermore, FIG. 10 is diagram showing an embodiment of trade fair and exhibition information for offering real-time information of another virtual trade fair 102 in addition to a virtual Messe. As shown in the figure, trade fair and exhibition information can be browsed through the Internet 106 but the information is not live. It is trade fair and exhibition information translated into many languages. As real-time information of another trade fair, a picture of the exhibition taken in the exhibition site 102, text information and the like are disclosed on the Internet from a Web server 103. The real-time information is trade fair and exhibition information looked at on a Web utilizing a high-speed Internet circuit 105, said trade fair and exhibition information being sent from the trade fair site and being composed of live pictures, sounds, graphics and texts, and is opened to the public on a large screen 108 installed at a place 107 where another exhibition is usually held or at a special site. This method can also perform a two-way communication. In the present invention, this is hereinafter referred to as a real virtual Messe Web site 100.

In a real virtual Messe Web site according to the present invention, a large screen using a high-speed Internet circuit is installed at the site of a trade fair and exhibition or at a site of a local city or the like. A visitor to the site can look at live trade fairs and exhibitions in various countries without visiting their actual sites. And it is possible also to immediately obtain a product catalog and the like using a device such as a DPT and the like by means of a two-way communication through a high-speed Internet circuit.

As a method of connecting to the Internet, there are such methods as a dial-up IP connection, private-line IP connection, mobile connection, communication satellite connection, CATV connection and i-mode connection.

A dial-up IP connection is a method of connecting to a provider's access point through a telephone circuit at a maximum of 56 kbps or an ISDN circuit at a maximum of 64 or 128 kbps. A private-line IP connection is a method of connecting to a provider by means of a private line through a router from a client on a private LAN/WAN. A mobile connection connects to a provider by means of either of two methods of a mobile telephone system and a PHS. A mobile telephone is connected to a provider at 9.6 kbps or at a maximum of 28.8 kbps. A communication satellite connection is an asynchronous communication which transmits a retrieval request from a Web client to a Web server on the ground and receives information from a Web server through a communication satellite. In short, it is a method of utilizing a high-speed large-capacity satellite circuit as only a down channel (transmission from a server) of the Internet. The communication satellite connection is used in an image transmission and the like through the Internet due to the possibility of transmission of a great amount of image data through a down channel. It is connected at a transmission rate of 400 kbps up to 1 Mbps. A CATV connection is a method of connecting to a CATV station utilizing a CATV network through a super high-speed cable modem from a personal computer and finally connecting to a provider through the CATV station. This connects at a maximum of 10 Mbps. It is an i-mode connection that is explosively increasing recently. An i-mode connection from a mobile telephone comes into the limelight as a new mobile terminal making possible various contents services such as electronic mail, online banking, ticket reservation, music, weather information and the like.

And a high-speed digital circuit can use a transmission rate of 64 kbps to 64 Mbps.

An embodiment of the present invention uses a high-speed digital circuit, but it is enough to properly use a communication circuit according to need.

According to the present invention, since multilingual contents obtained by translating a single piece of original contents into various languages in the world are formed into a database to be browsable, visitors of various countries in the world can browse the same contents in their respective own languages.

Further, it is possible also to browse the same advertisement in plural languages in the same way. An advertiser can expect the same effect as plural advertisements publicized to many countries by means of a single advertisement.

On the basis of such effects, the present invention provides a means for demanding an advertisement charge from an advertiser. The system counts visitors in each language and is designed so as to measure an advertisement effect in each language. And as an effect measuring method, a method of counting the number of times of accessing pages to indicate how many pages have been looked at may be used jointly. The present invention counts the number of times of reading each page by means of a counter of a Web.

An advertisement access analysis method is generally performed with three indexes of the number of hits, PV (page view) and the number of visitors. The number of hits is a numerical value indicating how many pieces of data have been requested for transmission from a Web site. The unit of the number of pieces of data in this case is the number of data files on a computer. A home page containing graphic information becomes more in number of hits due to its graphic information. Conversely, a page filled with only characters contained in one file is simply counted as one in number of hits.

An index of PV indicates how many home pages have been read in total in a Web site. A PV results in the same one PV regardless of its amount of information, and is used as a standard index indicating the media value or media effect of an advertisement exposed in a unit of page such as a banner advertisement. And there is an index of indicating the number of PVs of only the top page of a Web site as the number of visitors. Since the PV is simply the total number of pages which have been looked at, how many persons have looked at the pages cannot be grasped. One person may access the top page at plural times, and therefore the number of visitors in this case is an index as an approximate number.

An embodiment of the present invention uses this index as the number of visitors, but any of these other analysis methods may be used.

The advertisement charge collection management is performed by a database server 5. The settlement of accounts may be either a net settlement (electronic transaction) or a conventional settlement.

Further, another embodiment of the present invention is described with reference to FIG. 11. Offering information is an information service set so that only pre-registered persons can look at information. An ID and password are issued to a pre-registered person, and only the registered person is made to be able to look at information. A registered person needs to input its given password in order to look at information of the Web.

When an inputted password has been judged as a correct password, it becomes possible to look at information. As a method for issuing a password, there is a method of preparing a member registration page and enabling a user to input its mail address, sex, age, address, name, membership fee and the like. The system stores each item into its database and then issues an ID and password to the user and notifies the user of this fact.

In order that a member enters a site for members' exclusive use, an approval page is prepared and the member inputs its ID and password issued at the time of registration and they are checked by comparing them with the existing database.

In this case, a password is adopted as an embodiment for security, but various measures have been contrived against computer crimes increasing in recent years.

Advanced technologies for confronting hackers' techniques have been developed.

As such measures, it is first mentioned to secure the safety of a network. An illegal access or illegal impersonation is prevented by refusing access from a party not approved of connection. As a security technique for securing such safety, a technique of authenticating the person itself using an ID or password is generally in use, but there are also techniques capable of realizing a higher level of security such as a one-time password, electronic authentication, firewall installation and the like. In order to improve the protection and confidentiality of data, there are the encryption of electronic data by means of a common key or public key, the encryption of a communication channel by means of VPN, the repulsion of computer viruses by means of a virus wall and the like. However, the more the security is strengthened by these techniques, the worse a system becomes in convenience. Therefore, it is necessary to balance the convenience and security with each other. Any method may be adopted if determining a method for securing the security in consideration of these matters.

This service offers in many languages the latest information specialized in each of various fields in the world.

As examples of information to be offered, there are medical science, engineering, computer, entertainment, sports, economics and the like. In order to obtain these information, there is a system for always monitoring relevant information in all the world.

Figure 11:
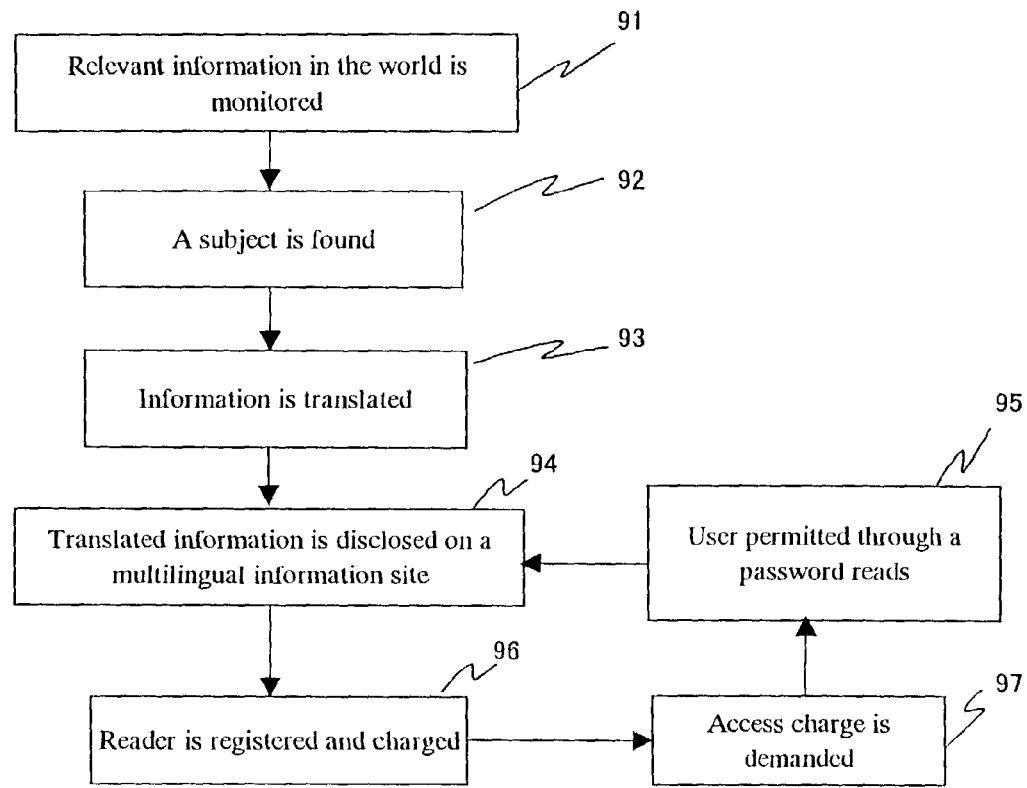
FIG. 11 shows a flowchart of performance in a system for registered users' exclusive use as another embodiment of the present invention.

FIG. 11 shows a process of providing such relevant information. A procedure from a step of collecting information to a step of offering information is explained with reference to FIG. 11. The system always monitors information capable of being offered in the world in order to obtain information (step 91), and in case of finding information of a subject of publication through the monitoring (step 92), obtains the information and immediately translates the obtained information into many languages (step 93). The translation performs multilingual translation utilizing a translation network as described above. The translated information is stored in a database, is carried as the latest information and is set in a browsable state (step 94). These system and method are as described above. A registered person approved of looking at the information (step 95) inputs its given password and ID, and can look at the information after the inputted password is checked and judged to be right.

Information to be looked at is offered with charge, and the charge is automatically counted by an accounting system according to a contract condition of the number of times of looking at it, an amount of information (the number of pages) or a looking time and thus an accounting process is performed (step 96). The accounting data of a user charged for reading are stored into an accounting file of the database server 5. As for demanding a charge, the database server 5 performs a charge demanding process according to a period of demand determined separately (step 97). In this case also, either an electronic transaction settlement or a conventional settlement by bank transfer of fund in place of an electronic settlement may be adopted. Management of registered persons for permission to access, management of registration fee and management of access charge are performed by the database server 5.

As apparently known from the above description, a method for providing multilingual information through a communication network, and a communication system and information recording medium for the same method according to the present invention have made it possible to quickly and inexpensively provide a plurality of multilingual information of virtual trade fair and exhibition information and the like in many languages by means of one Web site (a single Web site/firmware) consisting of one apparatus and one translation processing system on a communication network without bringing the enlargement of its processing scale and apparatus scale. Further, they can immediately provide information using a high-speed communication network.

INDUSTRIAL APPLICABILITY

The present invention is suitable for a method for performing multilingual translation utilizing a communication network and providing information in many languages through the communication network, a method for performing a virtual trade fair and exhibition in many languages, and a communication system and information recording medium for the same methods.

The invention claimed is:

1. A method for performing a multilingual information offer through a communication network, said method comprising;
   a step of translating contents of information into many languages;
   a step of entering the translated contents into a multilingual processing database, wherein a page record and a text record are given for processing each page of the translated contents in the multilingual processing database;
   a step of setting a storage area adaptively to a maximum number of characters,
   a step of judging whether or not characters of a language after translation can be accommodated in the storage area of the maximum number of characters in comparison with a number of characters of the language before translation through computing the number of characters after translation, wherein in case that the maximum number of characters after translation can be accommodated in the storage area, performing the translation, and in case that the maximum number of characters cannot be accommodated in the storage area, reducing the number of characters of the language before translation so as not to change the meaning,
   a step of providing multilingual translated contents of information and advertisements,
   a step of counting a number of visitors to an information site in each language,
   a step of demanding an advertisement charge from an advertiser on the basis of the number of visitors, and
   a step of performing these steps through one Web site having one apparatus and one translation processing system.

2. A method for performing a multilingual information offer according to claim 1, wherein said step of translating contents of information into many languages comprises;
   a step of receiving language data of a subject of translation,
   a step of automatically selecting language data for translation,
   a step of performing translation,
   a step of automatically changing translation processing form adaptively to a language after translation; and
   a step of receiving translated data from a translator.

3. A method for performing a multilingual information offer according to claim 2, wherein in said step of automatically selecting language data for translation, said information to be translated is prepared by using language data and image data which is non-language data in master contents by means of a template.

4. A method for performing a multilingual information offer according to claim 3, further converting the language data contained in said image data from a text form into a binary form and replacing the text-form data with the binary-form data.

5. A method for performing a multilingual information offer according to claim 2, wherein said step of performing translation is at least one of an automatic machine translation and a manual input translation.

6. A method for performing a multilingual information offer according to claim 1, wherein said Web site including one apparatus and one translation processing system performs a multilingual translation process and its maintenance process, and
   said multilingual translation process, includes generating master contents by means of a template, next translating language data of the master contents, repeating these generation and translation processes, storing the language data together with control information into the multilingual processing database, further converting the language data into HTML data and writing them into the master contents on request, and
   said maintenance process, includes monitoring change of the master contents, automatically selecting a language data file needed for translation, translating the language data, repeating these monitor, automatic selection and translation processes for necessary languages, and reentering the translated language data into the multilingual processing database, and disclosing the contents.

7. A method for performing a multilingual information offer according to claim 6, wherein a language to be used when reading contents can be automatically or optionally selected.

8. A method for performing a multilingual information offer according to claim 6, wherein said translated information includes game information, picture information, music information, sports information, talent information and auction information.

9. A method for performing a multilingual information offer according to claim 6, wherein said advertisement is carried in every page.

10. A method for performing a multilingual information offer according to claim 6, wherein said step of counting a number of visitors records a number of times at which contents have been selected in each language.

11. A method for performing a multilingual information offer according to claim 1, wherein said multilingual translated contents of information are of virtual trade fairs and exhibitions held in various countries in a world, said information including pictures, graphics, characters and sounds.

12. A method for performing a multilingual information offer according to claim 11, wherein said trade fairs and exhibitions are formed into a tree structure in which trade fair site information, trade fair and exhibition information, information of exhibiting companies and groups, and advertisements are translated into many languages and respective pieces of information are linked with one another in a form of a tree.

* * * * *